United States Patent
Crickmore et al.

(10) Patent No.: US 7,345,953 B2
(45) Date of Patent: Mar. 18, 2008

(54) FLEXTENSIONAL VIBRATION SENSOR (75) Inventors: Roger Ian Crickmore, Newburgh (GB); Sean Dormer Thomas, Newburgh (GB); Simon Tanner, Newburgh (GB); David John Hill, Newburgh (GB); Philip John Nash, Newburgh (GB)

(73) Assignee: Qinetiq Limited (GB)

( * ) Notice: Subject to any disclaimer, the term of this patent is extended or adjusted under 35 U.S.C. 154(b) by 290 days.

(21) Appl. No.: 10/533,761

(22) PCT Filed: Nov. 4, 2003

(86) PCT No.: PCT/GB03/04741

§ 371 (c)(1), (2), (4) Date: May 4, 2005

(87) PCT Pub. No.: WO2004/042425

PCT Pub. Date: May 21, 2004

(65) Prior Publication Data

US 2006/0109746 A1  May 25, 2006

(30) Foreign Application Priority Data

Nov. 8, 2002 (GB) .................................. 0226162.6

(51) Int. Cl.
*G01V 1/18* (2006.01)
(52) U.S. Cl. ...................................................... 367/163
(58) Field of Classification Search ................ 367/163
See application file for complete search history.

(56) References Cited

U.S. PATENT DOCUMENTS

| 4,951,271 | A |   | 8/1990 | Garrett et al. |
|---|---|---|---|---|
| 5,212,670 | A |   | 5/1993 | Brown |
| 5,227,624 | A | * | 7/1993 | Henning et al. ....... 250/227.23 |
| 5,317,929 | A |   | 6/1994 | Brown et al. |
| 5,431,058 | A |   | 7/1995 | Lagier et al. |
| 6,175,108 | B1 | * | 1/2001 | Jones et al. ............ 250/227.14 |
| 6,955,085 | B2 | * | 10/2005 | Jones et al. ............ 250/227.18 |
| 2001/0022757 | A1 |   | 9/2001 | Skinner et al. |
| 2006/0109746 | A1 | * | 5/2006 | Crickmore et al. ......... 367/178 |

FOREIGN PATENT DOCUMENTS

| CA | 2007096 | 7/1996 |
|---|---|---|
| JP | 06 180995 | 10/1994 |
| WO | WO 01/12345 | 2/2001 |

OTHER PUBLICATIONS

Danielson, et al. "Fiber-Optic Ellipsoidal Flextensional Hydrophones", Journal of Lightwave Technology, pp. 1995-2002 (1989).

* cited by examiner

*Primary Examiner*—Dan Pihulic
(74) *Attorney, Agent, or Firm*—McDonnell Boehnen Hulbert & Berghoff LLP (57) ABSTRACT

A vibration sensing device, package and system and a method of manufacturing a vibration sensing device are disclosed. The vibration sensing device comprises a body whose geometry is such that it exhibits flextensional properties.

24 Claims, 5 Drawing Sheets

FLEXTENSIONAL VIBRATION SENSOR

The present invention relates to the field of vibration sensing and in particular, in certain preferred embodiments to acceleration sensing or seismic sensing.

Current vibration sensing devices and, in particular, seismic sensors, such as geophones or accelerometers, typically use electronic transducers such as transducers using the reverse piezo-electric effect. Such devices generally use a mass-spring transducer mounted in a casing, the casing being in intimate contact with the surrounding medium in which the vibrations are propagating. These devices require on-board electronic conditioning circuitry. These electronics not only need power which may have to be transmitted for long distances they also require packaging to preserve them from a highly corrosive, vibrational and high pressure environment. The packaging and power requirements all lead to bulky installations. Furthermore, the electronics must also be highly reliable so that retrieval of the sensor package is not required; this means that the electronics package will be correspondingly expensive.

Generally, in the seismic field a plurality of seismic sensing devices are used together in an array and it is these arrays that form the bulkiest equipment in seismic sensing. Reducing the size of the individual sensing devices is therefore very important in this area.

A further problem with conventional electronic accelerometers that use the reverse piezo electric effect in high temperature seismic applications is that they experience reduced sensitivity when the Curie temperature is approached. This reduction in sensitivity can, in extreme cases, lead to a nullification of the piezo electric effect; this is a non-reversible process.

Alternatives to piezo-electric vibration sensing devices include fibre optic vibration sensing devices, these have the advantages of being light, being linked by optical fibre rather than copper cables and of using a fibre optic interferometric measurement technique which is a highly sensitive technique. Furthermore, they are resistant to temperatures up to several hundred degrees centigrade and are therefore unaffected by temperatures they are likely to meet in down hole oil field measurements. These devices are arranged such the optical fibre of the interferometer is stressed by some means. Generally, this is done by mounting the optical fibre on some flexible mandrel or disc structure. Unfortunately, these devices suffer from being relatively insensitive for their size as the fibre is stressed via a second order effect. In order to achieve high sensitivity the devices tend to require a large mass, typically greater than 500 grams. This not only makes the device bulky and heavy it also limits the frequency range in which the sensor can be used. An example of a flexural disc fibre optic accelerometers are given below.

U.S. Pat. No. 5,317,929 discloses a fibre optic accelerometer. This accelerometer comprises a pair of flexible disks mounted circumferentially on a rigid cylindrical body and having a mass mounted on a rod which extends between the disks and is centrally attached to both. An optical fibre is mounted in a spiral on the lower side of the upper disk and the upper side of the lower disk. The optical fibres are accessible at one end, having reflective portions at the other. Any variation in the length of the spiral optical fibres caused by flexure of the disks is detected and provides an indication of acceleration caused by physical displacement, shock or vibrations.

Vibration sensing devices such as accelerometers and in particular, those used in seismic sensing typically aim to measure signals such as acceleration in one direction and to be resistant to signals in other directions. The devices of the prior art suffer from problems of cross-axis sensitivity with off axis acceleration signals affecting the detected results of these accelerometers. Furthermore, many of the seismic sensing devices of the prior art are insensitive and thus, do not detect small vibrations. In an attempt to increase sensitivity some of the devices incorporate large masses, these tend to make the device heavy and unwieldy. It is desirable to produce a vibration sensor having low threshold levels in the on axis orientation and low responsivity in the off axis direction.

According to a first aspect of the invention there is provided a vibration sensing device comprising: a hollow flextensional body having a cross section that has a major and a minor axis, said flextensional body being operable to deform in response to received vibrational energy and thereby produce a variation in a predetermined property exhibited by said flextensional body in the direction of one of said major or minor axis, said flextensional body being shaped such that said variation in said predetermined property is amplified in the direction of the other of said major or minor axis; and a sensor coupled with the flextensional body and operable to detect the amplified variation indicative of received vibrational energy.

The use of a flextensional body to receive vibrational energy provides a system in which a variation in a property caused by vibration received by the flextensional body can be amplified by the flextensional body. This amplified property is sensed by the sensor. The properties of the flextensional body are such that comparatively small bodies and masses can be used, making it convenient to use in an array. Thus, a sensitive and convenient sensing device can be produced. Although acoustic transmitters are known which employ the flextensional principle to generate sonar waves. These transmitters are large, heavy devices being of the order of one metre high, one metre long and half a metre wide, they also carry heavy metal struts to protect them. When placed in water they are often powerful enough to make the water boil. The skilled person looking for a small, yet sensitive vibrational detector would not have thought of looking at these devices.

In preferred embodiments, said predetermined property comprises force, vibrational energy received along said minor axis causing deformation of said flextensional body, with a force acting along said minor axis and an amplified force acting along said major axis, said sensor being coupled to said flextensional body along said major axis to detect the amplified force.

This arrangement providing amplification of the vibration force that is to be detected at the sensor has been found to increase the sensitivity of the sensor significantly.

In other embodiments said predetermined property comprises displacement, vibrational energy received along said major axis causing displacement of said flextensional body along said major axis and an amplified displacement along said minor axis, said sensor being coupled to said flextensional body along said minor axis to detect the amplified displacement.

Although an outer housing is not necessary preferably said vibration sensing device further comprises an outer housing, said vibration sensing device being mounted within said outer housing. An outer housing protects the device and can provide a suspension system which reduces cross axis sensitivity. The outer housing can be sealed and filled with a damping fluid or it may be left open to the external environment.

Preferably, said vibration sensing device further comprises a mass mounted on said flextensional body. A mass increases the sensitivity of the device, the vibrational force causing acceleration of the mass.

In some embodiments, said minor axis has a first and a second end, wherein said sensor is mounted along said major axis of said flextensional body and said mass is mounted to said flextensional body in the proximity of said first end of said minor axis. This arrangement provides increased sensitivity due to the mass and amplification of the vibrational force due to the arrangement of the sensor, thus a particularly sensitive device is achieved.

With this arrangement it is preferable to mount said flextensional body to said outer housing via mounting means, said mounting means connecting a portion of said flextensional body in the proximity of said second end of said minor axis to said housing.

In other embodiments said major axis has a first and a second end, wherein said sensor is coupled along said minor axis of said flextensional body and said mass is mounted to said flextensional body in the proximity of said first end of said major axis. This arrangement provides amplification of the displacement which particularly with a mass attached provides a sensitive device.

With this arrangement it has been found to be preferable to mount said flextensional body on said outer housing via mounting means, said mounting means connecting a portion of said flextensional body in the proximity of said second end of said major axis to said housing.

Although the flextensional body can be formed of any material exhibiting appropriate properties and in particular stiffness, preferably, said flextensional body is formed of metal. Metal is a robust material that is sensitive to vibrational energy and exhibits suitable properties for transmitting vibrational energy to a sensor mounted upon it.

Preferably, said flextensional body comprises a tube having an elliptical cross section. An elliptical shape has been found to be particularly effective as a vibration sensor. It is a convenient shape for mounting the sensor on, and amplification of a received signal is both pronounced and mathematically easy to predict. It has also been found that a vibration sensor having an elliptical geometry can be made conveniently small and yet still be sensitive to vibration across a range of frequencies.

Although the mass may be mounted on the outside surface of the flextensional body, preferably, it is mounted within said flextensional body. This arrangement provides a compact device. This is an advantage in many applications such as in seismic sensing where a large number of these devices will be used together in an array.

Advantageously, said flextensional body comprises an outer wall, said outer wall having a substantially uniform thickness. Flextensional properties of a body depend to some extent on the wall thickness of the body being substantially constant.

In preferred embodiments, said major axis of said flextensional body is between 10 mm and 30 mm, preferably, 22 mm and said minor axis of said flextensional body is between 5 mm and 20 mm preferably 11 mm.

The dimensions of the flextensional sensors are small making the devices both small and light and suitable for mounting in an array. This is very different to flextensional transmitters which are large, heavy, unwieldy devices that are generally used singly.

Although the vibration sensing devices can have a number of different forms in some embodiments said vibration sensing device comprises an accelerometer.

In some embodiments said sensor comprises a strain sensor.

In preferred embodiments said sensor comprises an optical fibre coupled to said flextensional body such that deformation of said flextensional body produces a strain in said optical fibre which imposes a variation in at least one predetermined property of an optical signal transmitted through said optical fibre, said optical fibre being arranged such that at least one end is accessible for optical coupling to an optical device comprising a detector for detecting said changes in said at least one predetermined property of said transmitted optical signal.

Optical fibre sensors are extremely sensitive. Furthermore, they are small and light and do not require electrical power. Additionally, the fibre can be used as both the means to sense the signal and to transmit the data back to the interrogation unit. This means that there is no need to house any electronics in the deployed part of any sensing array. This leads to significant reductions in the size, complexity and hence cost of the system. Optical fibre sensors are also generally resistant to high temperatures and corrosive environments and as such are particularly well adapted for use in seismic applications.

Preferably, said optical fibre is coupled under stress to said flextensional body. By pre-stressing the optical fibre the net force acting on the fibre will generally remain either compressive or extensional. This helps keep the sensor in the linear displacement regime and avoids non-linearities in the detection region.

In some embodiments, said vibration sensing device further comprises blocks mounted on the outer surface of said flextensional body at either end of said minor axis, said optical fibre sensor comprising an optical fibre coil, said optical fibre coil being coupled to said flextensional body by being wound around said blocks, whereas in others said vibration sensing device further comprises blocks mounted on the outer surface of said flextensional body at either end of said major axis, said optical fibre sensor being coupled to said flextensional body by being wound around said blocks.

The blocks provide a convenient surface for the optical fibre to be mounted upon. Furthermore, their properties can be chosen to provide a surface that is not rough or sharp and thus will not damage the fibre. Additionally they provide an increased radius for the fibre to be wrapped around, this increases the length of sensing fibre that can be used thereby increasing its sensitivity. The blocks also increase the radius of the curve around which the fibre is wrapped, this decreases light loss which may occur if the bend in the curve is too sharp. Furthermore, wrapping an optical fibre directly on the flextensional body may inhibit its flexing properties.

Preferably, said blocks are formed of metal. Metal is a robust temperature resistant material. Furthermore, the material properties of metal are such that the physical response of the device will be relatively unaffected by the changes in temperature which may be encountered in some applications such as seismic applications. It is generally found to be appropriate to have blocks made from the same material as the flextensional body.

Advantageously, said optical fibre is coupled to said flextensional body such that both ends of said optical fibre are accessible for optical coupling to further optical devices. Many devices of the prior art only have one end of any optical fibre sensor accessible for coupling to external devices, the other end being located well within the device and having a reflective portion. Thus, any signal travelling through the fibre from the accessible end, is reflected back through the fibre by the reflective portion, exiting the fibre at the end that it entered. In the device according to an embodiment of our invention, the arrangement of the device is such that both ends of the optical fibre are accessible for external connection. Thus, a signal entering the device via one end of the fibre can exit it via the other end; this makes the device particularly adaptable for configuration into an array architecture. Optical fibre strain sensors are also particularly suitable for use in an array architecture with a high degree of multiplexing using both Dense Wavelength Division Multiplexing (DWDM) and Time Division Multiplexing (TDM) being possible with these sensors.

A second aspect of the present invention comprises a vibration sensing package, comprising three vibration sensing devices according to a first aspect of the present invention, wherein each of said three vibration sensing devices have a sensor coupled along an axis of said sensing device, said three vibration sensing devices being mounted such that said axes along which respective sensors are coupled are arranged orthogonally to one another.

Each of said individual vibration sensing devices is sensitive to vibrations along a particular axis. Mounting three such sensing devices orthogonally to each other provides a sensing package that is sensitive to vibrations in any direction. Such a package can detect vibrations in three dimensions and provide a directional component to the vibrations that are sensed.

In preferred embodiments said package further comprising a hydrophone. A hydrophone within the package provides a package that can measure both the pressure and the shear wave in a vibration sensing system.

A third aspect of the present invention provides a vibration sensing system, comprising: a first plurality of vibration sensing devices according to a first aspect of the present invention; an electromagnetic radiation source and an electromagnetic radiation detector; said optical fibres of said first plurality of vibration sensing devices being arranged in optical communication with each other and with said electromagnetic radiation source and detector; said electromagnetic radiation source being operable to transmit an optical signal into said optical fibres of said plurality of vibration sensing devices; and said electromagnetic radiation detector being arranged to receive electromagnetic radiation output from said plurality of vibration sensing devices and to detect a variation in at least one predetermined property of said output optical signal.

The vibration sensing devices of the present invention being small and light and having both ends of the optical fibre available are particularly well adapted to mounting in an array in a vibration sensing system. This makes them particularly suitable for use as seismic sensing devices.

In some embodiments the vibration sensing devices are arranged optically in series, whereas in others they may be arranged in parallel or in both parallel and series.

A further aspect of the present invention provides, a method of detecting vibrations comprising: coupling a sensor to a hollow flextensional body having a cross section that has a major and a minor axis, said flextensional body being operable to deform in response to received vibrational energy and thereby produce a variation in a predetermined property exhibited by said flextensional body in the direction of one of said major or minor axis, said flextensional body being shaped such that said variation in a predetermined property is amplified in the direction of the other of said major or minor axis; and placing said flextensional body in an environment where vibrational energy is to be detected; and detecting the amplified variation indicative of received vibrational energy with said sensor.

A still further aspect of the present invention provides a method of manufacturing a vibration sensing device according to a first aspect of the present invention comprising the steps of: (i) mounting blocks on an outside surface of said flextensional body at either end of said minor or said major axis: (ii) holding said flextensional body within chucks adapted to pass around and hold the outer edges of said blocks within an optical coil winding apparatus; (iii) passing an optical fibre through a reservoir of resin, such that a layer of resin coats said optical fibre, said optical fibre exiting said reservoir of resin via a needle, said needle being operable to position said optical fibre above said flextensional body held within said chucks and being arranged to allow a suitable amount of resin to coat said fibre; (iv) rotating said flextensional body such that said optical fibre is wound about said blocks mounted at either end of an axis of said flextensional body to form a coil of optical fibre wound around said axis, said coil being attached to said blocks by said resin and at least one end of said optical fibre being accessible for connection to external optical components.

The manufacture of these vibration sensing devices involves the direct winding of the coil onto the flextensional body. This is done using an apparatus that has been adapted to hold the flextensional body. The needle provides an excellent means for positioning the fibre accurately for mounting on the formers at either end of the flextensional body and for supplying the correct amount of resin.

Preferably, said step (iv) of winding said optical fibre is performed such that coil is wound under tension. Winding the coil under tension means that the flextensional body is pre-stressed. Thus, when it experiences vibrational forces acting in different directions this does not cause both compressional and extensional forces to act upon the ellipse. Rather in normal operation the net force acting along the sensing axis of the device remains compressive or extensional and within the linear displacement regime. This avoids signal distortion.

In preferred embodiments the method comprises a further step of continuing to rotate said flextensional body after winding said coil until said resin has set. This inhibits any drooping of the coil as it sets.

A yet further aspect of the present invention comprises the use of a flextensional body to detect vibrations. The shape function of flextensional bodies provides amplification of some signals and thereby provides a sensitive way of detecting vibrations.

Embodiments of the present invention will now be described, by way of example only, with reference to the accompanying drawings, in which.

Figure 1:
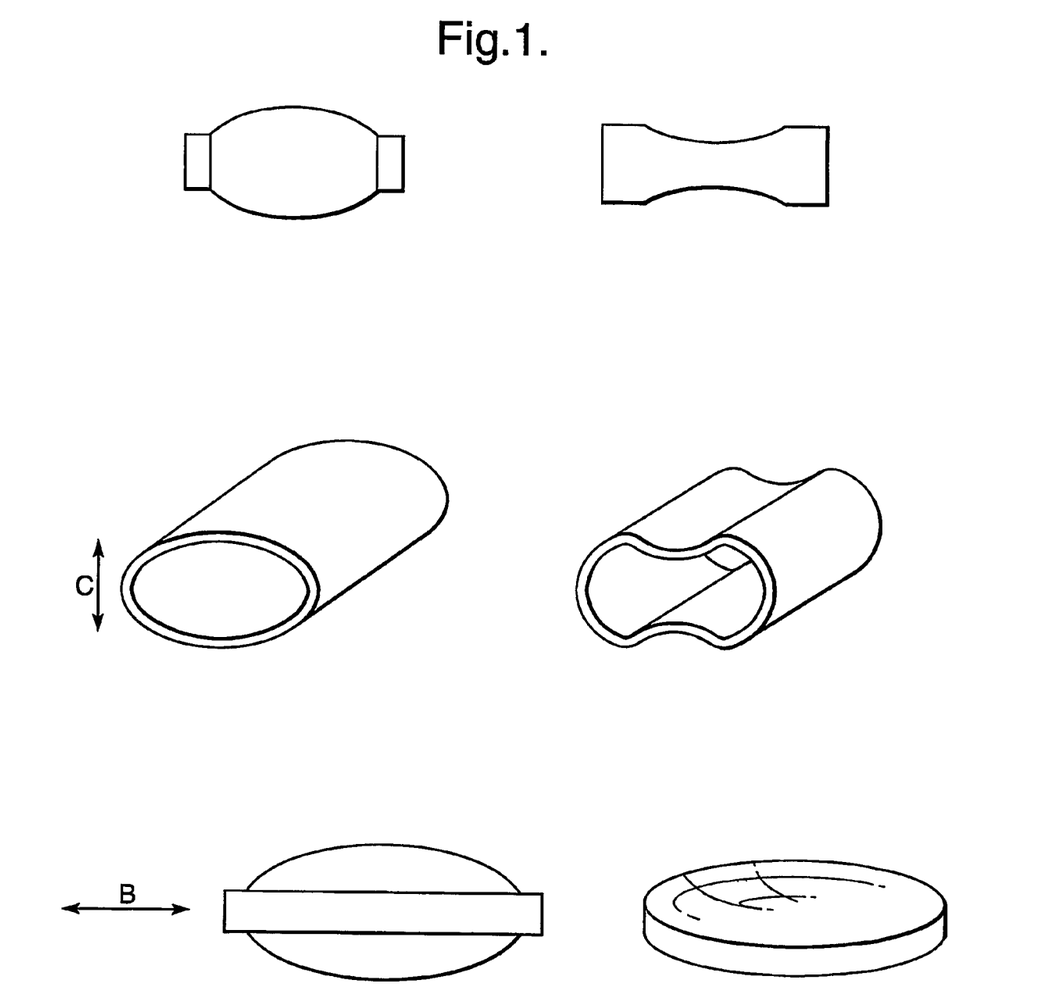
FIG. 1 shows a plurality of shapes that exhibit a flextensional property.

FIG. 1 shows several examples of shapes whose geometry is such that they exhibit a flextensional property. Arrow B shows the direction of the major axis of a cross section of these shapes, while arrow C shows the direction of the minor axis. The flextensional principle can be defined as the action of a shell, wherein the shell is put into flexure in response to an extensional and/or compressional force. If the shell exhibits an extension or compression along one of the major or minor axis of a cross section of the shell, then this causes flexure which produces a movement along the other axis. Depending on which axis the extension or compression occurs along, either the motion or the force is amplified through the mechanical advantage generated by the shape function. In the case of a flextensional acoustic transmitter the sound radiating surface of the shell is put into flexure when mechanically driven by an extensional vibration of a drive motor. In the present device wherein shapes having this geometry are used as receivers, the method of operation is reversed. The surfaces which are used to emit the acoustic signal into the surrounding medium are now used to receive the signal which causes a vibrational extension and/or compression along one axis and results in flexing of the body and movement along the other axis. IN the case of a receiver the driver motor is replaced with a sensor which senses this flexing.

Figure 2A:
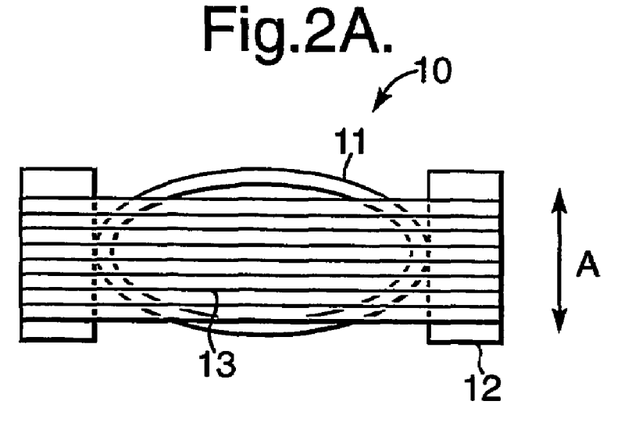
FIG. 2A shows a schematic side view of the core of a vibration sensing device according to an embodiment of the present invention wherein the sensing coil is coupled along the major axis of the device.
Figure 3:
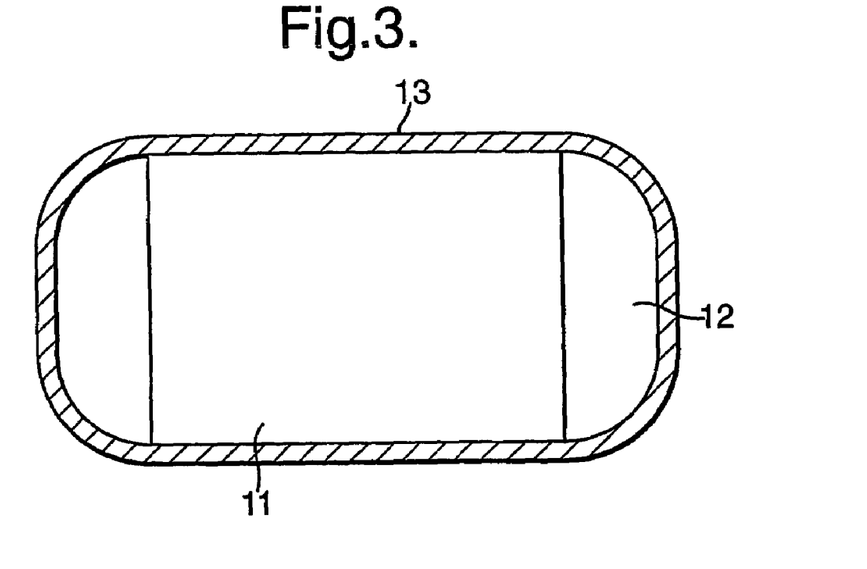
FIG. 3 shows a top view of an optical coil wound around the vibration sensing device of FIG. 1.
Figure 4:
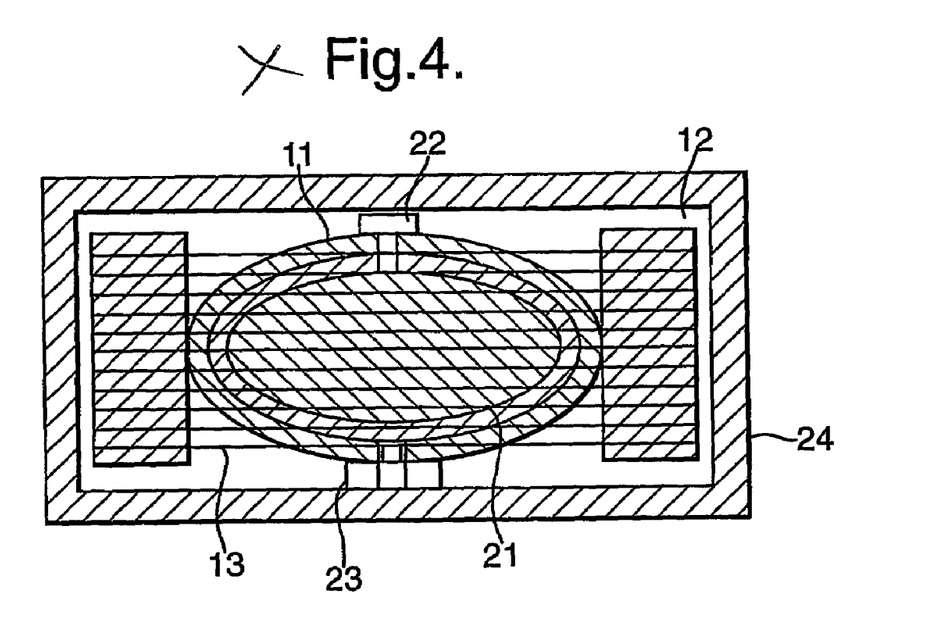
FIG. 4 shows a vibration sensing device according to an embodiment of the present invention comprising the core illustrated in FIGS. 2A and 2B mounted in a housing.

FIG. 2A illustrates the core of a vibration sensing device according to an embodiment of the present invention and shows a flextensional elliptical shell 11 having end pieces or formers 12. The formers are mounted on the elliptical shell at the ends of the major axis of the shell in the plane containing the major axis normal to the minor axis. An optical fibre sensing coil 13 is wound around the formers and elliptical shell along the major axis of the shell. The formers 12 have curved edges (see FIG. 3) and thus allow the fibre coil to be wound around the ellipse without too much strain and associated problems of fibre breakage. The formers 12 also provide the optical fibre with a larger radius around which to bend than would the ellipse edge by itself. A larger bend radius of the optical fibre reduces optical losses. Furthermore, direct winding of the optical coil on the flextensional body would inhibit its deformation and thereby reduce the sensitivity of the device. A mass (shown in FIG. 4 is mounted to the flextensional elliptical shell 11. The mass is between 40 and 100 grams, typically between 60 to 80 grams.

Figure 2B:
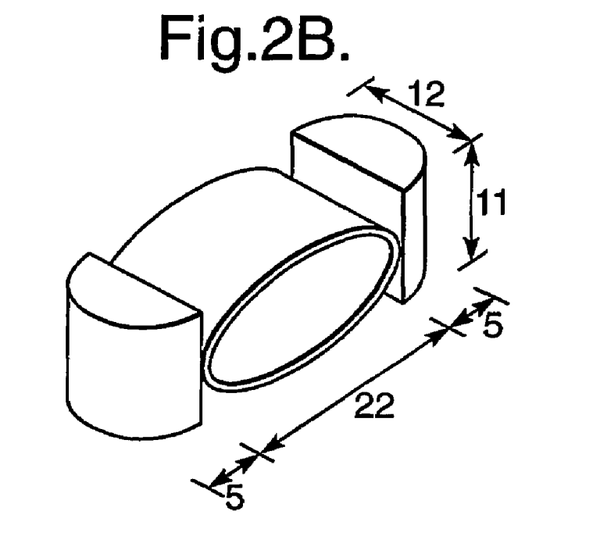
FIG. 2B shows the core of FIG. 2A with its dimensions in mm.

FIG. 2B shows the same core in perspective. As can be seen the flextensional elliptical shell 11 is 22 mm long and 12 mm wide. The formers 12 are 5 mm long and 11 mm tall. These are preferred dimensions and other dimensions are also envisaged.

The elliptical shell is preferably formed from metal with the end pieces or formers being made of metal. The material properties of the metal are not greatly affected by changes in temperature particularly by the range of temperatures that are expected to be encountered in seismic applications and thus such temperature variations should not appreciably affect the physical response of the device.

In use, when a component of acceleration occurs parallel to the minor axis (arrow A), the force required to accelerate the inertial mass (shown in FIG. 4) generates a strain along the minor axis, and a strain of the opposite sense will be set up along the major axis. The use of the elliptical shell in this arrangement means that the force that is applied to the optical fibre sensor (or other sensor in other embodiments) mounted along the major axis is greater than the force that would be applied to the sensor if it was mounted along the minor axis, and this leads to an increase in the device's sensitivity. In other words the force is amplified through the mechanical advantage generated by the shape function of the elliptical shell.

FIG. 4 shows a vibration sensing device according to an embodiment of the present invention comprising the core illustrated in FIG. 2, having an elliptical shell (11), coil (13), outer casing (24), and an inertial mass (21) mounted within the elliptical shell. The elliptical shell has holes at either end of the minor axis. A bolt (22) passes through one of these holes and into the inertial mass (21) connecting the inertial mass to one end of the minor axis. The other hole is used to attach the other end of the minor axis of the shell (11) to the rigid outer casing (24). A washer (23) is used to lift the shell (11) away from the case so that the end pieces 12) do not foul on the case (24). In some embodiments, rather than being attached to an outer casing the device is attached via the hole in the minor axis to the structure whose acceleration is being sensed.

Figure 5:
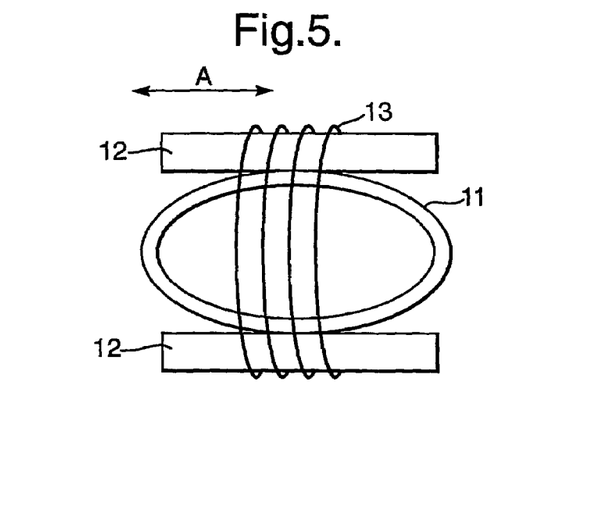
FIG. 5 shows a schematic sectional view of the core of a vibration sensing device according to another embodiment of the present invention wherein the sensing coil is coupled along the minor axis of the device.

FIG. 5 illustrates the core of a vibration sensing device according to a further embodiment of the present invention and shows a flextensional elliptical shell (11) having end pieces or formers (12). In this embodiment the formers are mounted on the elliptical shell at the ends of the minor axis of the shell in the plane containing the minor axis normal to the major axis. An optical fibre sensing coil (13) is wound around the formers and elliptical shell along the minor axis of the shell. The formers (12) have curved edges and thus allow the fibre coil to be wound around the ellipse without too much strain and associated problems with breakage of the fibre. The formers 12 also provide the optical fibre with a larger radius around which to bend than would the ellipse by itself. A larger bend radius of the optical fibre reduces optical losses.

As in the previous embodiment the elliptical shell is preferably formed from metal with the end pieces or formers being made of metal.

In this embodiment, the vibration sensor senses motion in the direction of the major axis of the ellipse (arrow A) by utilising the shape function of the geometry of the shell to change the orientation of the vibration and to achieve some mechanical amplification. In effect the force required to accelerate the inertial mass generates a strain along the major axis, and a strain of the opposite sense will be set up along the minor axis. The use of the elliptical shell in this arrangement means that the displacement that is applied to the optical fibre sensor (or other sensor in other embodiments) mounted along the minor axis is greater than the displacement that would be applied to the sensor if it was mounted along the major axis. In other words the displacement has been amplified through the mechanical advantage generated by the shape function of the elliptical shell.

In both embodiments vibrational forces or acceleration forces parallel to the minor axis but acting in different directions can cause both compressional and extensional forces to act upon the minor axis of the ellipse. These forces are in turn transferred as compression or tension to the fibre. This is undesirable as it may lead to non-linearities in the response that can cause signal distortion. To avoid distortions it has been found to be preferable to pre-stress the device so that in normal operation the net force acting along the minor axis of the device must remain compressive or extensional. To ensure low distortion when the device is excited, it must remain in the linear displacement regime. To this end the optical fibre coils are wound under stress.

Given that individual sensors are sensitive to vibrations parallel to a particular axis, three sensors mounted orthogonally with each other, so that vibrations in each of three dimensions can be detected are often mounted together as a unit. Further, multiplexing can then occur with a plurality of these units being mounted together in an array. In some devices a hydrophone is also mounted within the package. This provides information on the shear wave.

Figure 6:
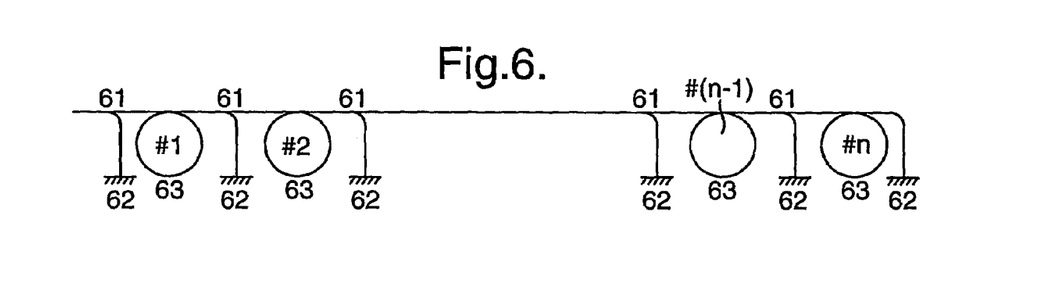
FIG. 6 schematically shows a plurality of vibration sensing devices arranged in series.
Figure 7:
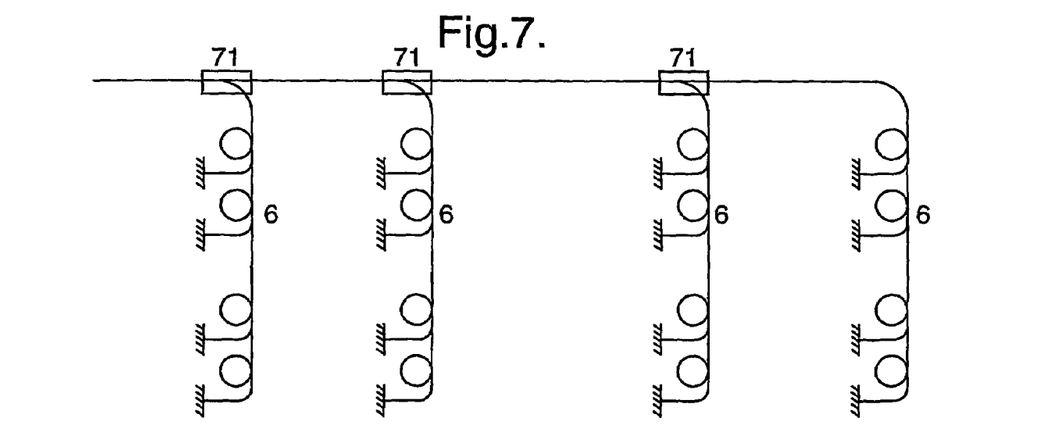
FIG. 7 shows a plurality of optical fibres arranged in parallel and in series.

FIGS. 6 and 7 illustrate possible ways of multiplexing the individual vibration sensing devices to form an array. The multiplexing regimes used are Time Division Multiplexing (TDM) in the array of FIG. 6 and both Time Division Multiplexing and Dense Wavelength Division Multiplexing (DWDM) in the architecture of FIG. 7.

FIG. 6 shows the individual optical sensing coils 63 arranged in series. The coils 63 are bracketed by couplers 61. Attached to one of the outputs of the coupler 61 is a mirror 62, the other output is connected to a sensing coil 63. These couplers 61 and mirrors 62 are so arranged that there is a reflector before and after each coil so that a pair of light pulses contained within the fibre are reflected from the mirrors 62. The first pulse is split by the first coupler 61 a portion of the pulse is reflected back and the rest is directed into the coil 63, this pulse is then split by the next coupler 61 a portion of the light is then reflected back from the mirror. At the same time the second pulse is being split by the first coupler 61 and one portion of the light is reflected back. The lengths of the fibres and the timing of the pulses are selected such that the second pulse returning from the first mirror and the first pulse returning from the second mirror coincide on the receiver at the same time. Changes in phase between the two signals can be used to detect changes in length and/or refractive index of the coil resulting from strains imposed on the coil.

FIG. 7 shows a plurality of these serially connected strings of vibration sensing devices or seismic sensing devices connected in parallel. The strings of seismic sensing devices are multiplexed and connected in parallel, using DWDM architecture. Items 71 are Multiplex/Demultiplex units these isolate a single frequency from the source and direct it to the relevant Seismic sensing device string and then multiplex the signal back into the signal fibre.

Figure 8:
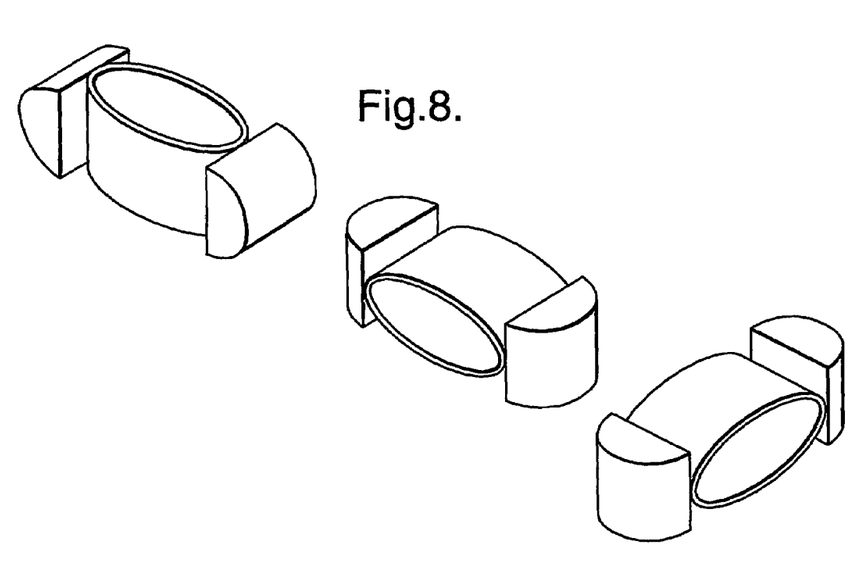
FIG. 8 shows three vibration sensing devices according to an embodiment of the present invention mounted orthogonally to each other as a vibration sensing package.

FIG. 8 shows three of the vibration sensing device arranged orthogonally to each other. These three devices may be mounted in a housing with a hydrophone to form a vibration sensing package. This package can then be used to provide information on both magnitude and direction of any received vibration.

Figure 9:
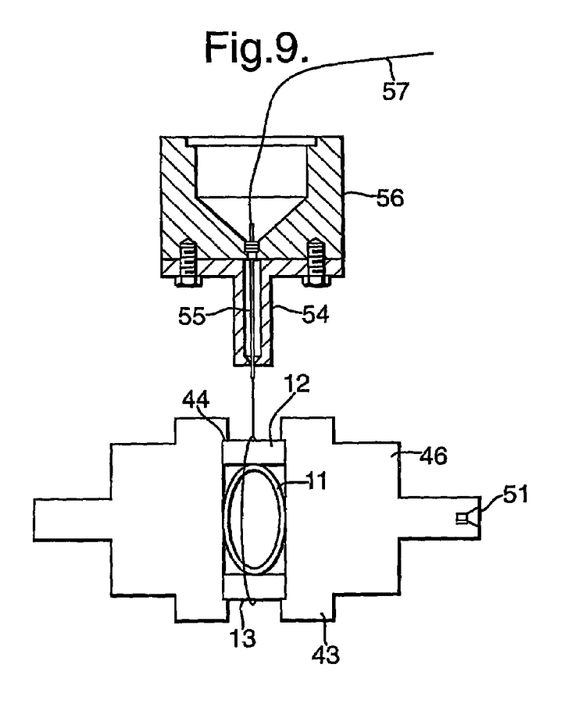
FIG. 9 shows an apparatus used to wet wind the coils.

FIG. 9 shows an apparatus used to wet wind the coils 13 around the flextensional body. When manufacturing the vibration sensing device according to an embodiment of the present invention the basic elliptical shell is modified to make it suitable for mounting an optical fibre on without causing the fibre to break. End or cheek pieces are added to each side (as shown in FIGS. 2 and 5), these are plates which extend the entire length of the coil and are the same width (or length depending on embodiment) as the elliptical shell. This produces an interesting shape that needs to be held by chucks in a wet winding machine to wind the optical fibre coil onto the device. Thus, special holders 43 are made to accept the ellipse 11 and end pieces 12. These holders comprise a recess 44 into which the end pieces 12 fit. This recess serves to both hold the flextensional body and to provide keepers to prevent the fibre escaping during the winding process. The holder comprises a broad spindle 46 that serves as a support around which the fly leads from the device can be wrapped during manufacture to keep them safe.

When winding the coil, the flextensional body is mounted and then clamped between the holders, one of which is mounted onto the tailstock of a winding machine. A length of fibre is initially drawn through the bath and the needle prior to the bath being filled with resin. This length is then passed once around the flextensional body 11, 12 and secured to the winding mandrel on spindle 46. The bath is then filled with fluid epoxy resin and hardener mixture or other similar bonding material and winding is commenced. The fibre 57 passes through the needle 55 which is used to position the fibre in the correct position and to strip the excess resin from the fibre 57. Item 54 holds the needle rigidly in position relative to the bath 56 and the positioning arm of the precision winding machine.

When 20 m of fibre has been wound onto the flextensional body 11, 12, the winding is stopped. The bath is then emptied and a further fly lead is then drawn through and secured to the spindle 46. To prevent any sagging of the composite coil the device is rotated until the resin has gelled. Depending on the type of resin used a post cure may be advised.

As the process and arrangement of the coil is such that the fibre is free at both ends a number of the vibration sensors can be wound in one go. For example, the three components for the three axis measurements can be wound in one process. This not only reduces the construction time, it may also reduce optical losses between devices as it reduces the need for splicing.

The winding machine has an integral tension controller which adjusts and maintains the tension applied to the fibre as it is wound. As explained above the coil is wound under tension and it is important that a relatively constant tension is applied throughout the coil. Using the needle 55 positioning system it is not necessary to remove any excess resin as only the correct amount of resin is left on the fibre 57.

Once the epoxy resin has cured then the device can be assembled from the chosen parts. Care must be taken to not damage the fibre 57 as it exits the vibration sensing device.

The Optical Fibre 57 used in an embodiment of this invention has a 6 micron core with an 80 micron cladding. However, other types of optical fibre could be used. The epoxy resin used must have a high modulus to transfer the strains from the flextensional body 11, 12 to the fibre 57.

The optical vibration sensing devices of embodiments of the present invention are particularly well suited to assembly into an array, individual signals being isolated with the use of time division or wavelength division multiplexing. In particular, the accessibility of both ends of the optical fibre in individual vibration sensing devices aids in this array architecture.

In summary, embodiments of this invention provide a highly sensitive seismic sensing device which exhibits a low cross-axis sensitivity and can be easily multiplexed using both time division and dense wavelength division multiplexing.

The invention claimed is:
1. A vibration sensing device comprising:
  a hollow flextensional body having a cross section that has a major and a minor axis, said flextensional body being operable to deform in response to received vibrational energy and thereby produce a variation in a predetermined property exhibited by said body in the direction of one of said major or minor axis, said flextensional body being shaped such that said variation in said predetermined property is amplified in the direction of the other of said major or minor axis;

a mass mounted on said flextensional body such that vibrational energy received along said minor axis causes acceleration of the mass, and a sensor coupled with the flextensional body along said major axis and operable to detect the amplified variation indicative of received vibrational energy.

2. A vibration sensing device according to claim 1, wherein said predetermined property comprises force.

3. A vibration sensing device according to claim 1, said vibration sensing device further comprising an outer housing for housing said vibration sensing device.

4. A vibration sensing device according to claim 1, wherein said minor axis has a first and a second end, said mass being mounted to said flextensional body in the proximity of said first end of said minor axis.

5. A vibration sensing device according to claim 4, said vibration sensing device further comprising an outer housing for housing said vibration sensing device wherein said flextensional body is mounted to said outer housing via mounting means, said mounting means connecting a portion of said flextensional body in the proximity of said second end of said minor axis to said housing.

6. A vibration sensing device according to claim 1 wherein said flextensional body comprises a tube with an elliptical cross section.

7. A vibration sensing device according to claim 1, wherein said mass is mounted within said hollow flextensional body.

8. A vibration sensing device according to claim 1, wherein said flextensional body comprises an outer wall, said outer wall having a substantially uniform thickness.

9. A vibration sensing device according to claim 1, wherein said vibration sensing device comprises an accelerometer.

10. A vibration sensing device according to claim 1, wherein said sensor comprises a strain sensor.

11. A vibration sensing device according to claim 1, wherein said sensor comprises an optical fibre coupled to said flextensional body such that deformation of said flextensional body produces a strain in said optical fibre which imposes a variation in at least one predetermined property of an optical signal transmitted through said optical fibre, said optical fibre being arranged such that at least one end is accessible for optical coupling to an optical device comprising a detector for detecting said variation in said at least one predetermined property of said transmitted optical signal.

12. A vibration sensing device according to claim 11, wherein said optical fibre is coupled under stress to said flextensional body.

13. A vibration sensing device according to claim 11 wherein said vibration sensing device comprises blocks mounted on the outer surface of said flextensional body at either end of said major axis, said optical fibre sensor being coupled to said flextensional body by being wound around said blocks.

14. A vibration sensing device according to claim 11, wherein said optical fibre is coupled to said flextensional body such that both ends of said optical fibre are accessible for optical coupling to further optical devices.

15. A vibration sensing package, comprising three vibration sensing devices according to claim 1, each of said three vibration sensing devices having a sensor coupled along an axis of said sensing device, said three vibration sensing devices being mounted such that said axes along which respective sensors are coupled are arranged orthogonally to one another.

16. A vibration sensing package according to claim 15, said package further comprising a hydrophone.

17. A vibration sensing system, comprising:

a first plurality of vibration sensing devices according to claim 11;

an electromagnetic radiation source and an electromagnetic radiation detector;

said optical fibres of said first plurality of vibration sensing devices being arranged in optical communication with each other and with said electromagnetic radiation source and detector;

said electromagnetic radiation source being operable to transmit an optical signal into said optical fibres of said plurality of vibration sensing devices; and said electromagnetic radiation detector being arranged to receive electromagnetic radiation output from said plurality of vibration sensing devices and to detect a variation in at least one predetermined property of said output optical signal.

18. A vibration sensing system according to claim 17, where said first plurality of vibration sensing devices are arranged optically in series.

19. A vibration sensing system according to claim 17, said sensing system further comprising a plurality of partial radiation reflectors, said plurality of partial radiation reflectors being arranged before and after each of said plurality of vibration sensing devices; wherein said electromagnetic radiation source is operable to transmit a plurality of pulses into said first plurality of vibration sensing devices such that a pulse of radiation that is reflected back through one vibration sensing device by a reflector immediately after said vibration sensing device reaches said electromagnetic radiation detector at the same time as, and interacts with, a subsequent pulse reflected by a reflector immediately before said one vibration sensing device;

said variations in said at least one predetermined property of said optical signal detected by said electromagnetic radiation detector being variations in phase.

20. A vibration sensing system according to claim 19, further comprising a signal processor including a time division demultiplexer, said signal processor being operable to process signals produced by said electromagnetic detector in response to said variations in phase and to isolate signals from individual vibration sensing devices using said time division demultiplexer.

21. A vibration sensing system according to claim 18, further comprising:

a second plurality of vibration sensing devices arranged optically in series with each other, said second plurality of vibration sensing devices being arranged optically in parallel with said first plurality of vibration sensing devices; and a first arid second wavelength multiplex/demultiplex unit operable to isolate a single frequency; wherein said electromagnetic source is operable to produce pulses of radiation at first and second frequencies and said first and second wavelength multiplex/demultiplex units are arranged such that pulses of said first frequency are transmitted from said source to said first plurality of vibration sensing devices and pulses of said second frequency are transmitted from said source to said second plurality of vibration sensing devices.

22. A vibration sensing system according to claim 21, further comprising at least one further plurality of vibration sensing devices and at least one further wavelength multiplex/demultiplex unit, said at least one further plurality of vibration sensing devices being arranged optically in parallel with said first and said second plurality of vibration sensing devices; wherein said electromagnetic source is operable to produce pulses of radiation at first, second and at least one further frequency and said at least one further multiplex/demultiplex unit is arranged such that pulses of said at least one further frequency are transmitted from said source to said at least one further plurality of vibration sensing devices.

23. A vibration sensing system according to claim 20 wherein said first plurality of vibration sensing devices are arranged optically in parallel.

24. A method of detecting vibrations comprising:

coupling a sensor to a hollow flextensional body having a cross section that has a major and a minor axis said sensor coupled along said major axis, said flextensional body being operable to deform in response to received vibrational energy and thereby produce a variation in a predetermined property exhibited by said flextensional body in the direction of one of said major or minor axis, said flextensional body being shaped such that said variation in a predetermined property is amplified in the direction of the other of said major or minor axis;

coupling a mass to said flextensional body such that vibrational energy received along said minor axis causes acceleration of the mass;

placing said flextensional body in an environment where vibrational energy is to be detected; and detecting the amplified variation indicative of received vibrational energy with said sensor.

* * * * *